(12) United States Patent
Jane Santamaria

(10) Patent No.: US 7,273,256 B2
(45) Date of Patent: Sep. 25, 2007

(54) INFANT SEAT WITH ARMRESTS FOR MOTORCARS

(75) Inventor: Manuel Jane Santamaria, Palau de Plegamans (ES)

(73) Assignee: Jane S.A., Palau de Plegamans (Barcelona) (ES)

( * ) Notice: Subject to any disclaimer, the term of this patent is extended or adjusted under 35 U.S.C. 154(b) by 0 days.

(21) Appl. No.: 10/843,076

(22) Filed: May 11, 2004

(65) Prior Publication Data

US 2004/0232748 A1 Nov. 25, 2004

(30) Foreign Application Priority Data

May 14, 2003 (ES) ............................ 200301159 U
May 20, 2003 (ES) ............................ 200301228 U

(51) Int. Cl.
  *A47C 1/08* (2006.01)
  *B60N 2/28* (2006.01)
(52) U.S. Cl. ................ 297/344.11; 297/256.1
(58) Field of Classification Search ............ 297/250.1, 297/256.16, 256.1, 411.35, 411.38, 411.3, 297/411.32, 183.9, 344.1, 340, 344.11
See application file for complete search history.

(56) References Cited

U.S. PATENT DOCUMENTS

| 1,942,998 | A | * | 1/1934 | Browne | 248/393 |
|---|---|---|---|---|---|
| 2,480,773 | A | * | 8/1949 | Ross | 297/68 |
| 3,404,917 | A | * | 10/1968 | Smith | 297/256.1 |
| 4,754,999 | A | * | 7/1988 | Kain | 297/256.14 |
| 4,915,446 | A | * | 4/1990 | Darling et al. | 297/256.14 |
| 4,936,627 | A | * | 6/1990 | Guim | 297/238 |
| 5,242,144 | A | * | 9/1993 | Williams et al. | 248/429 |
| 5,597,209 | A | * | 1/1997 | Bart et al. | 297/411.38 |
| 5,769,495 | A | * | 6/1998 | Vairinen | 297/411.32 |
| 6,126,234 | A | * | 10/2000 | Cabagnero | 297/256.13 |
| 6,158,807 | A | * | 12/2000 | Hampton | 297/256.1 |
| 6,283,545 | B1 | * | 9/2001 | Ernst | 297/256.16 |
| 6,382,726 | B2 | * | 5/2002 | Bullesbach et al. | 297/411.38 |
| 6,505,887 | B2 | * | 1/2003 | Hampton | 297/256.1 |
| 6,578,922 | B2 | * | 6/2003 | Khedira et al. | 297/411.32 |
| 6,698,838 | B2 | * | 3/2004 | Kain | 297/411.32 |
| 6,739,661 | B1 | * | 5/2004 | Dukes | 297/256.13 |
| 6,752,462 | B1 | * | 6/2004 | Kain et al. | 297/411.38 |
| 2003/0057759 | A1 | * | 3/2003 | Kain | 297/411.32 |

* cited by examiner

*Primary Examiner*—Joseph Edell
(74) *Attorney, Agent, or Firm*—Merchant and Gould P.C.

(57) ABSTRACT

An infant seat with armrests for motorcars has an inclinable backrest. The infant seat is slidingly fitted onto a base and has a locking mechanism being apt to lock it in different points of its shiftinig travel on the base. The armrests are each made up by an independent member being linked in a pin-jointed connection to the respective side of the seat and devices for stabilizing them in different height positions. The base is arranged on the seat of the motorcar at its back side leaning against the backrest of the seat. The infant seat is apt to be shifted forwards, and its backrest leans with different inclinations on the backrest of the motorcar's seat.

3 Claims, 2 Drawing Sheets

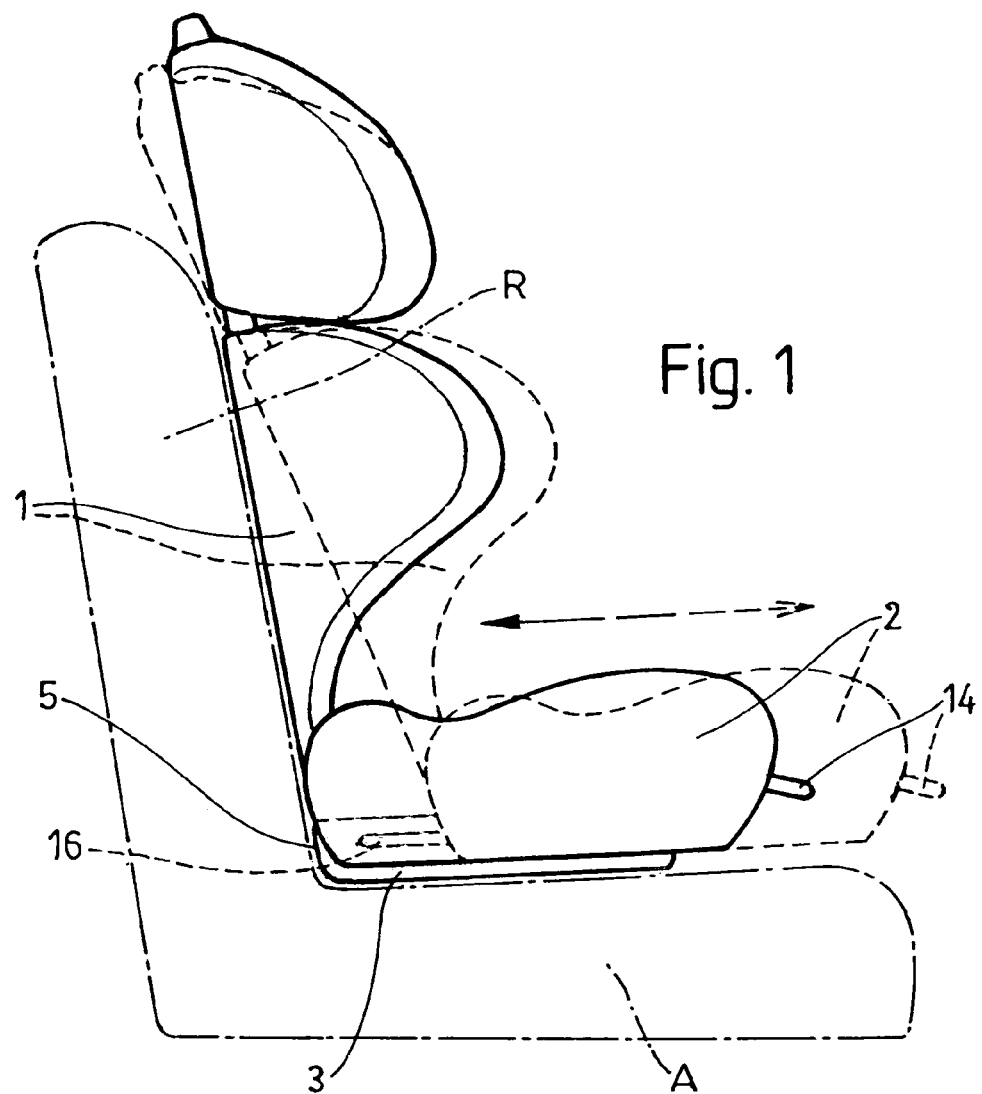
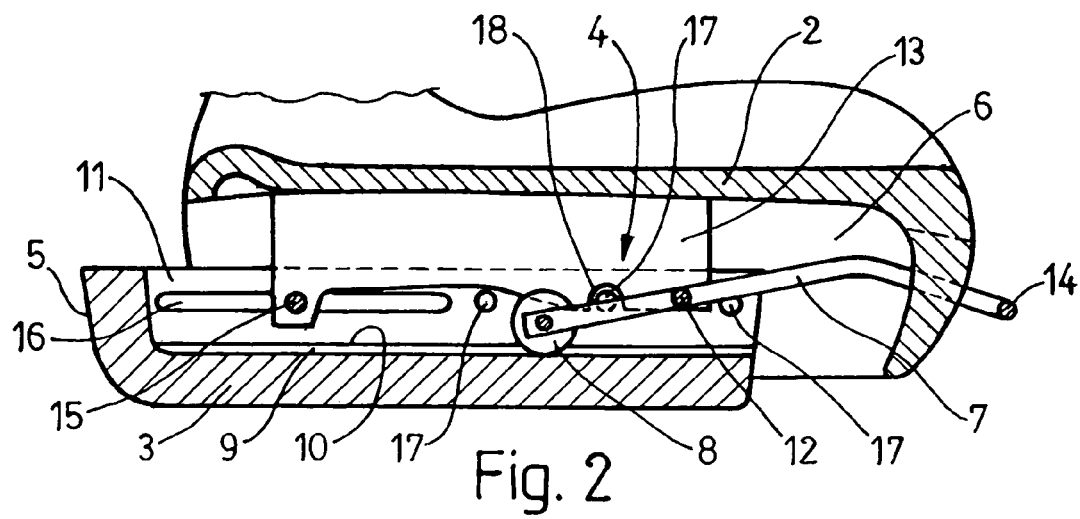

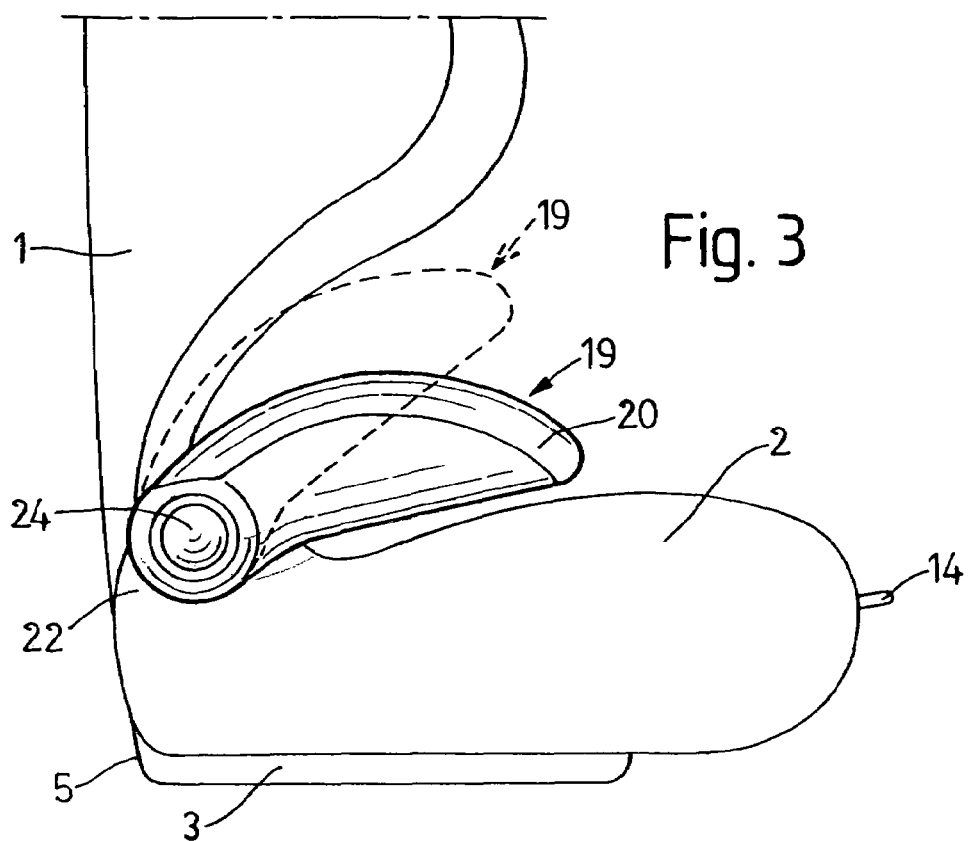
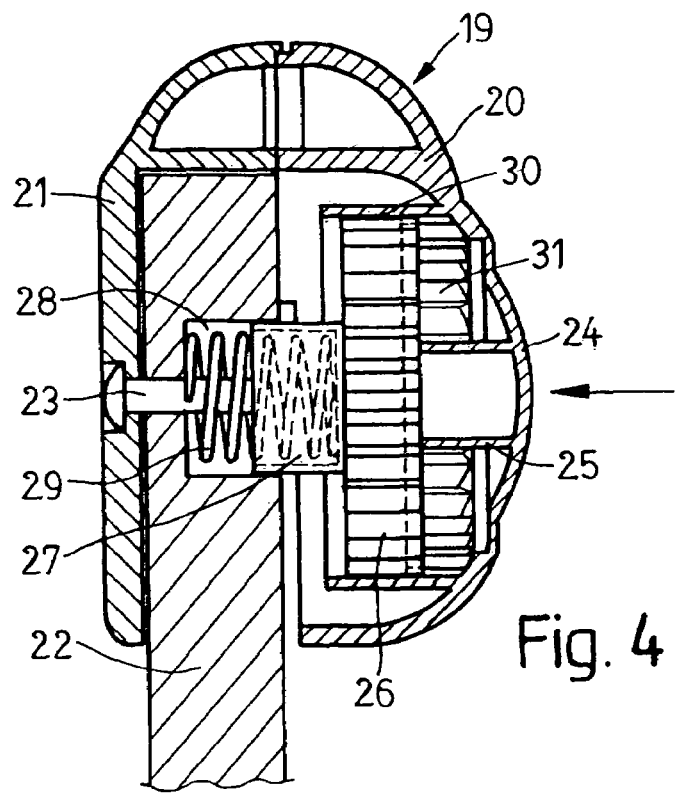

US 7,273,256 B2

INFANT SEAT WITH ARMRESTS FOR MOTORCARS

OBJECT OF THE INVENTION

An infant seat with armrests for motorcars.

BACKGROUND OF THE INVENTION

Infant seats of several models for motorcars are already known which are to be arranged on the seat of said vehicles and comprise an articulated backrest resting on the backrest of the seat of the motorcar, and are laterally provided at each side with a respective handrail acting by way of armrest.

In this kind of infant seats there is the problem that when the child falls asleep it is not possible to sufficiently incline their backrest since this latter can only be inclined as per the inclination of the backrest of the motorcar's seat, and therefore it is not possible to have the child in a comfortable position as correct as necessary during its sleep.

From among the known seats some of them comprise a height adjustable headrest, and others are besides provided with a backrest having lateral extensions being linked to it.

Those of this latter kind of seats are apt to be used in the different stages of the child's growth and development, i.e. that they can be used for children of from 1 to some 8 years of age since these seats are apt to be both vertically and laterally adjusted so that the child is always protected.

These seats have the drawback that because of the fact that the armrests are arranged in a fixed arrangement and at a relatively low level the child is as it grows more and more uncomfortable and laterally unprotected because the armrests are at a very low level.

SUMMARY OF THE INVENTION

The infant seat with armrests being the object of the present invention has been devised in order to solve these problems, said infant seat actually allowing to obtain a bigger inclination of the backrest thanks to the fact that the seat itself can be shifted forwards so that a longer distance being covered by the infant seat when being shifted forwards will bring about a bigger inclination angle of its backrest leaning on the backrest of the motorcar's seat.

A characteristic feature of this infant seat lies for such a purpose in the fact that said seat is slidingly fitted onto a base being arranged on the motorcar's seat, at its back side leaning against the backrest of the motorcar's seat and comprising locking means being apt to lock the infant seat at several points along its shifting travel.

On its lower surface and in the empty space being formed by it this infant seat comprises the mechanism allowing to shift and lock it and having an operation grab handle projecting to the outside through the front side of the seat; and the upperly hollow base comprises the guides for the correct shifting of the infant seat and the locking points allowing to lock it in the different positions.

As for the armrests, they are each made up by an independent member being linked in a pin-jointed connection to the respective side of the seat and comprising means being apt to stabilize them in different height positions.

The means being apt to stabilize the different height positions of the armrests are advantageously installed in the very back end where they are linked to the seat in a pin-jointed connection.

These and other characteristics will be best made apparent by the following detailed description whose understanding will be made easier by the accompanying two sheets of drawings showing a practical embodiment being cited only by way of example not limiting the scope of the present invention.

DESCRIPTION OF THE DRAWINGS

In the drawings:

FIG. 1 illustrates in a side elevation the infant seat being the object of the invention, said infant seat being in this view arranged on the seat of a motorcar;

FIG. 2 shows in a longitudinal section the lower portion of said infant seat showing the means being apt to lock its shifting on the base;

FIG. 3 illustrates in a side elevation the armrest being fitted to the infant seat; and FIG. 4 shows in a cross-sectional elevation the detail of the means being apt to stabilize the different height positions of the armrest.

DETAILED DESCRIPTION

According to the drawings the infant seat for motorcars comprises an inclinable backrest (1) being freely linked to the very seat (2) itself.

Said seat (2) is fitted in a longitudinally sliding arrangement onto a base (3) and comprises locking means (4) being apt to lock it at different points along its shifting travel.

Said base (3) is provided to be arranged on the seat (A) of the motorcar while at its back side (5) leaning against the backrest (R) of said seat (A), the infant seat being apt to be shifted forwards in order to thus obtain the inclination of its backrest (1) as shown with dash lines in FIG. 1.

The very seat (2) itself has its lower surface forming an empty space (6) housing the mechanism allowing to shift and lock it in different positions, said mechanism comprising a U-shaped support with branches (7) each ending at their end in a respective rolling member (8), said rolling members running on lateral guides (9) of the bottom (10) of the upper empty space (11) being formed by said base (3), said branches (7) at an intermediary point (12) being fitted to the forward portion of each of two longitudinal flanges (13) being inferiorly solid with the lower surface forming the empty space (6) of the seat, the U-shaped support forming an operation grab handle (14) projecting to the outside through the front side of the infant seat.

At their lower portion said flanges (13) are fitted to a transversal pin (15) being guided at each of its ends along a respective guide slot (16) being provided in each of the sides of the base (3).

This base has also been provided with the locking points being apt to lock the different positions of the seat, said locking points being made up by stubs (17) being horizontally aligned and fixed to the inner surface of the sides of the base (3), a notch (18) being provided in the lower edge of the flanges (13) being apt to be selectively engaged with said stubs.

To change the infant seat's position the forward portion of the seat (2) will be lifted by acting on the grab handle (14) so that the notches (18) will be lifted off the corresponding stub (17), whereupon the grab handle (14) will be pulled or pushed whereby the rolling members (8) will roll on the base (3), and when the notches (18) meet with other stubs (17) the action being exerted on the grab handle (14) will be stopped whereby the seat will be dropped thereby being locked in its new position.

The armrest (19) is made up of two longitudinal portions (20) and (21) being connected to each other and arranged one (20) of them in an outwardly facing arrangement and the other one (21) in an inwardly facing arrangement, said inwardly facing portion having a lower opening through which the armrest (19) is linked in a pin-jointed connection to each of the sides (22) of the seat by means of the pin (23). pin-jointed connection to each of the sides (22) of the seat by means of the pin (23).

The outwardly facing portion (20) of the armrest has at its back and in correspondence with the pin (23) a central region (24) being bulged to the outside and having a weakened makeup, said central region functioning as an operating button thanks to its resilient flexibility. When being pressed this button region (24) presses by means of an inner tubular protrusion (25) a toothed wheel (26) having a tubular projection of square cross-section (27) on its inwardly facing surface, said tubular projection being apt to be received into a recess (28) also being of square cross-section and being provided in each of the sides (22), a coil spring (29) being arranged between said toothed wheel (26) and the bottom of said recess (28).

The outwardly facing portion (20) of the armrest forms on is inner surface a circular cavity (30) having a toothed inner periphery (31) matching the toothed profile of wheel (26).

As shown in FIG. 4, the toothed wheel (26) is engaged with its teeth in the toothed periphery (31) of the circular cavity (30) thus keeping the armrest (19) stabilized in its position.

When wishing to change said position in order to arrange the armrest at a bigger height, for example, the operating button region (24) will be pressed so that the toothed wheel (26) will when pushed release the toothed periphery (31) of the cavity (30), as a result of which the armrest can then be turned around pin (23). When ceasing to press the operating button region (24) the spring (29) recovers and thereby pushes the toothed wheel (26) back into engagement with the aforesaid toothed periphery (31), as a result of which the armrest (19) is then again in a stabilized position.

The invention can within its essentiality be put into practice in other embodiments only in detail differing from the one having been described above only by way of example, said other embodiments also falling within the scope of the protection being claimed.

The invention claimed is:

1. An infant seat with armrests for motorcars, comprising an inclinable backrest, slidingly fitted onto a base wherein a seat portion comprises a locking mechanism lockable at different points of shifting travel on said base, wherein the seat portion has a lower surface forming an empty space with the locking mechanism disposed in the empty space providing for shifting and locking the locking mechanism, and wherein the base defines an upperly hollow portion comprising guides for the correct shifting of the seat portion and locking points providing for locking the seat portion in different positions; wherein the locking mechanism comprises a U-shaped support with branches that each end in a respective rolling member, said branches at an intermediary point being fitted to each of two flanges projecting from the lower surface forming the empty space of the seat portion.

2. The infant seat with armrests for motorcars as per claim 1, wherein the armrests each comprise an independent member linked in a pin-jointed connection to the respective side of the seat portion and means for stabilizing the armrests in different height positions.

3. The infant seat with armrests for motorcars as per claim 1, further comprising means for stabilizing the armrests installed in a back end of the infant seat where the armrests are linked to the seat portion in a pin-jointed connection.

* * * * *